United States Defensive Publication [19] (H) [11] T969,005

Tanaka et al. [43] Apr. 4, 1978

[54] COLOR PHOTOGRAPHIC MATERIALS CONTAINING HIGH-BOILING ORGANIC SOLVENT

[76] Inventors: Akira Tanaka; Akikazu Mikawa; Yuji Mihara; Yasuo Mukunoki, all of No. 210 Nakanuma, Minami Ashigara-shi, Kanagawa, Japan

[21] Appl. No.: 818,704

[22] Filed: Jul. 25, 1977

[30] Foreign Application Priority Data

Jul. 23, 1976 Japan ..... 51-88538

[51] Int. Cl.[2] ..... G03C 1/40

[52] U.S. Cl. ..... 96/100 R; 96/94 R; 96/132; 96/137

[57] ABSTRACT

In a highly or superhighly sensitive color photographic material having at least one highly or superhighly light-sensitive silver halide emulsion layer containing a color-forming coupler and silver iodobromide grains color-sensitized with a dye having at least one sulfo group or carboxy group, the silver halide emulsion grains having a mean grain size of larger than about 1 micron, the occurrence of fog due to pressure stimulus is prevented effectively by the incorporation of a high-boiling organic solvent having a boiling point of higher than about 175° C at normal pressure in the silver halide emulsion layer in an amount of higher than about 20% by weight of the amount of binder present in the emulsion layer.

9 Claims, No Sheets Drawing,

61 Pages Specification

The file of this unexamined application may be inspected and copies thereof may be purchased (849 O.G. 1221, Apr. 9, 1968).